US006054671A

United States Patent [19]

Shelton et al.

[11] Patent Number: 6,054,671

[45] Date of Patent: Apr. 25, 2000

[54] METHODS OF MAKING A CHAIN SAW GUIDE BAR WITH HIGH WEAR RESISTANCE STRIPS

[75] Inventors: Kent Phillip Shelton, Dyersburg; James Lee Johnson, Milan, both of Tenn.

[73] Assignee: Sandvik AB, Sandviken, Sweden

[21] Appl. No.: 09/206,221

[22] Filed: Dec. 7, 1998

[51] Int. Cl.[7] .................... B23D 63/00

[52] U.S. Cl. .................... 219/121.64; 219/121.63; 219/121.61; 219/121.6; 219/121.68; 219/121.67; 219/121.69; 76/112

[58] Field of Search .................... 219/121.64, 121.63, 219/121.61, 121.6, 121.68, 121.67, 121.69; 76/112

[56] References Cited

U.S. PATENT DOCUMENTS

| | | | |
|---|---|---|---|
| 3,071,490 | 1/1963 | Pevar . | |
| 3,241,228 | 3/1966 | Rayniak et al. . | |
| 3,760,141 | 9/1973 | Espana et al. . | |
| 3,858,321 | 1/1975 | Conaty . | |
| 3,987,543 | 10/1976 | Ratz et al. | 30/383 |
| 4,768,289 | 9/1988 | Apfel et al. | 30/383 |
| 5,144,867 | 9/1992 | Yajima et al. | 76/112 |
| 5,179,785 | 1/1993 | Nagashima | 30/382 |
| 5,407,496 | 4/1995 | Stehle et al. | 148/522 |
| 5,448,929 | 9/1995 | Sundström . | |
| 5,603,311 | 2/1997 | Hoerner et al. | 125/21 |
| 5,655,304 | 8/1997 | Apfel et al. | 30/383 |

*Primary Examiner*—Patrick Ryan
*Assistant Examiner*—M. Alexandra Elve
*Attorney, Agent, or Firm*—Burns, Doane, Swecker & Mathis, L.L.P.

[57] ABSTRACT

To increase the wear resistance of the nose of a chain saw guide bar, a U-shaped strip of wear-resistant alloy is welded to the edge surface of each side rail of the guide bar at the nose. Each strip has a greater width at the crest of the strip than at the ends thereof. The strips are formed by making identical curved cuts through a plate formed of the alloy, whereby each cut forms a wave-shaped element comprising at least two U-shaped strips that are joined end-to-end. The individual strips of the element are severed from one another before being welded to the respective side rails. The strips could be formed of cobalt-chrome-tungsten alloy, and thermally age-hardened, prior to being welded onto the side rail.

13 Claims, 2 Drawing Sheets

METHODS OF MAKING A CHAIN SAW GUIDE BAR WITH HIGH WEAR RESISTANCE STRIPS

BACKGROUND OF THE INVENTION

The present invention relates to a guide bar for a chain saw and, in particular, to methods of making such a guide bar.

Depicted in FIGS. 1 and 7 is a conventional guide bar (10) for a chain saw. The guide bar includes side rails (50) spaced apart by a middle rail (52) to form a groove (8) in which the drive links of a saw chain travel.

It is well known that the guide bars are subjected to excessive wear at their curved nose region where a saw chain exerts a great pressure on the curved edges even when the chain saw machine is idling without cutting wood, unless the saw chain is carried around the nose of the guide bar by a sprocket or roller. Guide bars with sprocket or roller noses have thus become the preferred design, unless the work environment is such that it is not possible to make a sprocket bearing with acceptable lifetime, such as when sawing has to be done in water or in other wet or abrasive environments. For such cases guide bars are often made with the nose faced with a smooth layer of some alloy having high wear resistance, usually cobalt-chrome-tungsten alloy, as described in U.S. Pat. No. 4,768,289 for example.

Several methods have been tried for the application of the alloy, including arc welding with or without an intermediate layer as described in U.S. Pat. Nos. 3,071,490 and 3,760,141, but these methods produce a thick rounded bead which afterwards has to be ground to the final shape, with a considerable waste of material. Another method suggested has been melting of alloy powder in a shaped mold held against the guide bar nose, as described in U.S. Pat. Nos. 5,144,867 and 5,448,929, but this method may produce porous alloy facing and also require grinding afterwards. It is also known to produce the alloy as a square section bar, which is bent around the guide bar nose and welded into place, as described in U.S. Pat. Nos. 3,241,228, 5,407,496 and 5,655,304, but this method requires a relatively soft alloy which may later be deformed in service even if it is not worn away. The alloy can also be made as precision cast pieces to be brazed onto the guide bar as disclosed in U.S. Pat. No. 3,858,321, but that is a slow and expensive method.

It is also known to laser weld a U-shaped strip (11) on the nose of each rail (50) as shown in FIGS. 1 and 7. It is conventional to form the strips from a plate (40') of a hard material arch as Stellite 6® (see FIG. 6). The plate has a thickness T (FIG. 6A) which corresponds to a width W of the rail (50) (see FIG. 7). The strips (11) are formed by a stamping process wherein strips (11A, 11B, etc.) are stamped successively from the plate. A crest (12) of the U-shaped strip has a width W1 which is greater than a width W2 at the ends (13) of the strip (see FIG. 6). Such a configuration enables waste of material to be minimized during the stamping-out procedure, and provides the greatest amount of wear-resistant material at the place of greatest wear on the guide bar nose.

However, it is necessary to prepare the plate (40') for the stamping process by cutting a wider plate (not shown) into sections (40') each having a width W3 corresponding to a desired length of each strip, which adds to the cost of forming the strips.

Also, it is conventional to surface harden the strips after they have been stamped out, but the resulting hardness is not uniform throughout the strip.

Thus, it would be desirable to provide a more economical method for forming the wear resistant strips.

It would also be desirable to provide wear resistant strips having a more uniform hardness.

SUMMARY OF THE INVENTION

The invention relates to a method of increasing the wear resistance of a nose of a chain saw guide bar. The guide bar comprises two side rails forming a groove therebetween. Each side rail has an edge surface and is curved at one end thereof to form a nose. The method comprises the steps of:

A. providing a plate of wear resistant alloy having a thickness substantially equal to a width of each of the edge surfaces;

B. making a series of identical cuts through the plate to form identical wave-shaped elements, each wave shaped element including at least two generally U-shaped strips joined end-to-end, each strip having a non-uniform width which is larger at a crest of the strip than at opposite ends thereof;

C. separating the strips from one another; and

D. . . welding each strip onto the edge surface of a respective side rail at the nose thereof, whereby the crest of the strip is situated at a tip of the nose.

The invention also involves a method of increasing the wear resistance of a nose portion of a chain saw guide bar comprising the steps of:

A. producing U-shaped strips of cobalt-chrome-tungsten alloy, each strip having a curvature corresponding to a curvature of the edge surface at the nose;

B. age hardening the strips by heating the strips to a temperature of at least 1380° F. for at least seven hours; and C. welding each of the strips to a respective edge surface at the nose thereof.

The invention also involves another method of increasing the wear resistance of a nose portion of a chain saw guide bar: wherein the age hardening is performed by heating the strips to a temperature of from 1470 to 1500° F. for at least three hours.

BRIEF DESCRIPTION OF THE DRAWING

The objects and advantages of the invention will become apparent from the following detailed description of a preferred embodiment thereof in connection with the accompanying drawings in which like numerals designate like elements, and in which.

DETAILED DESCRIPTION OF THE PREFERRED EMBODIMENTS

Figure 7:
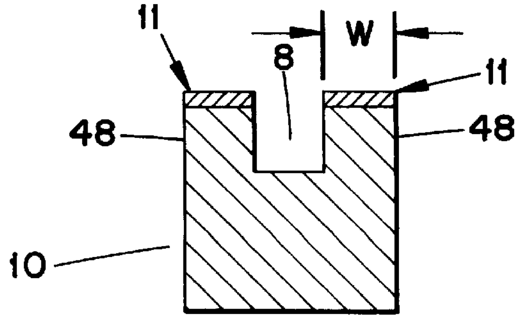
Fig. 7 (PRIOR ART)
FIG. 7 is a sectional view taken along the line 7—7 in FIG. 1.

To guide a saw chain along the edge of a conventional guide bar (10), the edge is provided with a groove (8)

penetrated by drive links of the chain, and on each side of the groove there are provided rail edge surfaces (48) along which the side links and cutter links of the chain can slide (see FIG. 7). In guide bars that are not provided with a roller or sprocket at the nose, the side and cutter links will slide on the rail surfaces along not only the longitudinal portions (14) of the guide bar edge, but also along the nose region of that edge, thereby exerting great pressure and causing great wear in the nose region because of the curvature of the edge.

Figure 6:
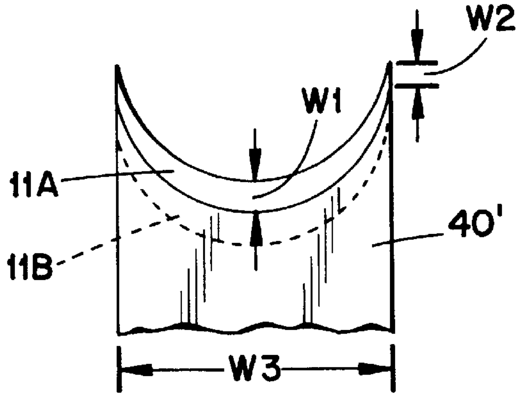
Fig. 6 (PRIOR ART)
FIG. 6 depicts a conventional strip-forming technique involving stamping wear resistant strips from a plate.
Figure 6A:
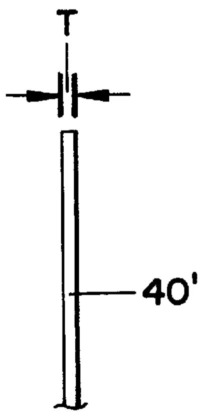
Fig. 6A (PRIOR ART)
FIG. 6A is a side view of the plate depicted in FIG. 6.

As explained earlier herein, in order to minimize wear, each of the rail edge surfaces in the nose region is provided with a wear resistant alloy strip (11). The amount of wear depends on the force with which the chain is pressing on the rail surface, which in turn is strongly dependent on the curvature of the edge. The wear is thus most intense at the tip of the nose region, and gradually diminishes towards the ends of the longitudinal portions. Consequently, it is known that for a given amount of alloy, the longest wear lifetime is achieved if the alloy strip (11) is widest at the guide bar tip, and becomes gradually narrower towards the ends (13) of the strip situated closer to the longitudinal edges (14). In the prior art, the strips (11) have been formed one-at-a-time by a stamping process as depicted in FIG. 6.

Figure 1:
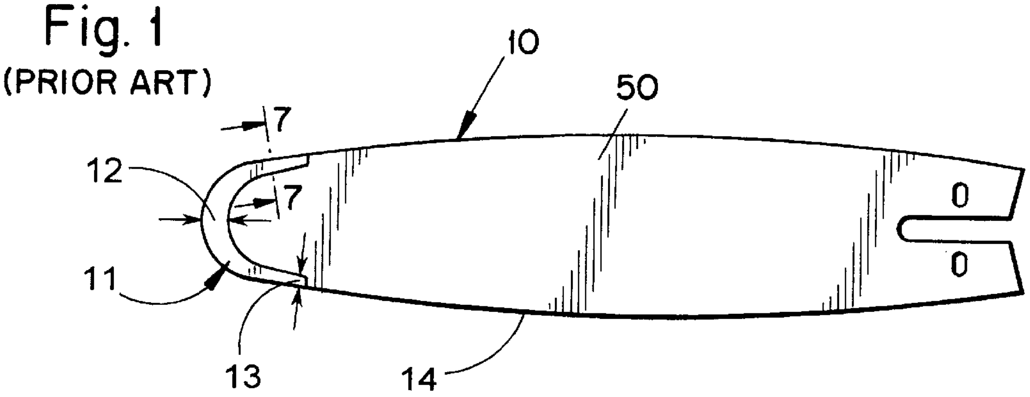
Fig. 1 (PRIOR ART)
FIG. 1 shows a chain saw guide bar with a conventional wear resistant alloy strip applied to the nose region.
Figure 2:
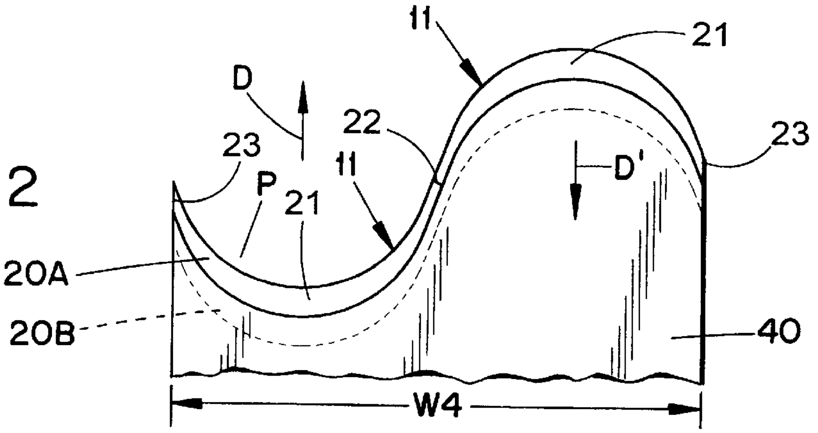
FIGS. 2–3 show respective ways of cutting a plate of wear resistant alloy to produce strips for application to guide bars according to the invention.
Figure 3:
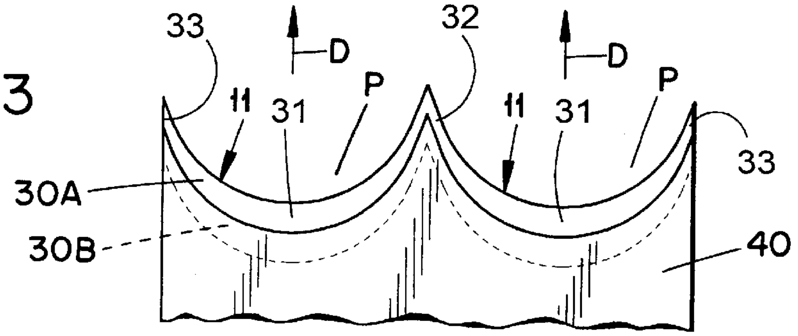

According to the present invention, a plurality of wear resistant strips (11) is formed simultaneously by cutting wave-shaped elements from a plate (40). Then, the individual strips (11) are severed from one another. FIGS. 2 and 3 show different wave-shaped elements, respectively but the shape of the individual U-shaped strips (11) is the same in each case.

As is conventional, the plate (40) comprises a wear resistant alloy, preferably chrome-cobalt, or chrome-cobalt-nickel alloy. The strips (11) are welded separately onto respective rail edge surfaces (48), and the welding is preferably done by laser or electron beam. The guide bar is preferably made of one piece, with the groove 8 milled out. However, if the guide bar were instead made from two thin plates with side rails spotwelded to a middle rail, the alloy strip could be applied to the side rails before or after the spotwelding.

The alloy strip (11) should cover an arc A of at least 150 degrees at the guide bar nose, and the crest portion (12) disposed at the tip of the nose should be at least 25% wider than the regions adjacent to the end points (13) of the strip. The width W of the alloy strip (11) is equal to the plate thickness T of the plate (40) and corresponds to the width of the rail edge surface (48).

According to the first embodiment of the invention, the plate (40) formed of the wear-resistant alloy has a uniform width W4 and uniform thickness, the width W4 being larger than the width W3 used in a conventional stamping process. Sequentially cut from the plate (40) by laser or abrasive jet are wave-shaped multi-strip elements (20A, 20B etc.), as shown in FIG. 2. Each element (20A) comprises two U-shaped strips (11) joined together end-to-end at a connecting point (22). The two U-shaped strips form respective pockets P which open in opposite directions D, D'. The elements (20A, 20B) are thus shaped similarly to a sine wave, although the individual U-shaped strips could be configured as segments of a circle or an ellipse.

The width of each strip and the curvature thereof is largest at the crests (21) thereof, and the width is least at the ends (23) and at the connecting point (22) where the wave curvature changes direction. The cut-out wave-shaped element (20A) is then subdivided into the two U-shaped strips (11) of appropriate length by shearing or laser cutting at the narrow connecting point (22). Once the wave-shaped element has been subdivided, the ends (23) corresponding to the strip edges may be trimmed or shaped.

Instead of cutting wave-shaped elements whose U-shaped strips open in opposite directions, there could be cut from the plate 40, wave-shaped elements (30A, 30B, etc.) whose U-shaped strips open in the same direction D, as shown in FIG. 3. Thus, adjacent pairs of U-shaped elements form a W-shape. Each element thus comprises two U-shaped strips (11) joined together end-to-end at a narrow connecting point (32). The width of each strip (11) and the curvature thereof is greatest at the crest (31), and the width is least at the ends (33) and at the connection point (32) where the curvature changes direction. The element (30A) is subdivided into the two U-shaped strips (11) by shearing or laser cutting at the point (32). Then, the ends of the strip can be trimmed or shaped.

Figure 5:
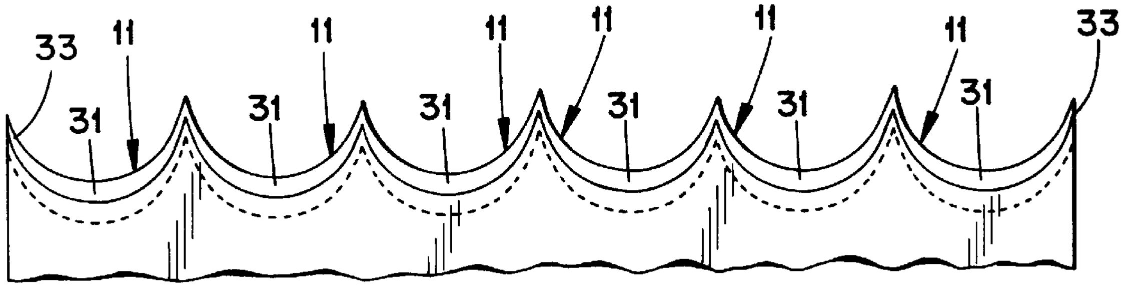
FIG. 5 depicts another preferred way of producing wear resistant strips according to the invention.

The type of wave-shaped elements (30A, 30B) employed in connection with FIG. 3 could be used to simultaneously form more than two strips (11), e.g., six or more strips (11) as shown in FIG. 5.

While it is conventional to form U-shaped strips (11) from a plate (40') by a stamping procedure (see FIG. 6), the present invention employs laser cutting or abrasive jet. It is especially advantageous to employ a laser device for cutting-out the elements, because then the same laser device can be employed to laser-weld the U-shaped strips to the rails.

Figure 4:
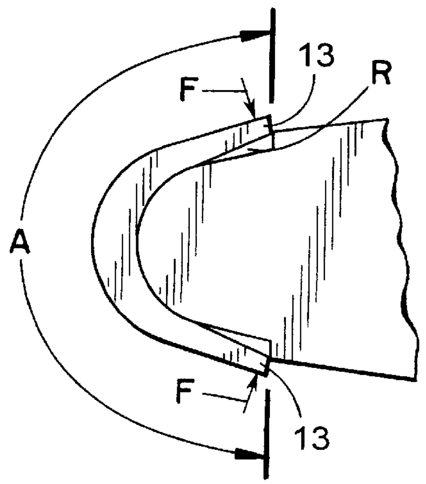
FIG. 4 shows how a piece of alloy is bent to conform with the guide bar.

Between the strip ends (13) the strip shape may be chosen to fit the shape of the guide bar nose. Thus, the U-shaped strips of FIGS. 2, 3, 5 could be circular arcs or non-circular (e.g., elliptical) arcs. Preferably, the curvature should fit the guide bar nose contour at least at the tip (12) where the wear is most severe, to allow application of the alloy strip without deformation Towards the ends (13) the U-shaped strip may initially be less curved than a receiving recess R formed in the guide bar nose and may then need some final shape adjustment before welding, which could be achieved by the application of forces F to the strip ends as shown in FIG. 4. This can be facilitated by simultaneously conducting an electric current through the strip which softens the ends (13) where the thickness is less.

Among the hard alloys which are considered suitable for this invention are cobalt-chrome-tungsten alloys such as that marketed under the trademark Stellite 6®. After the strips have been cut out, they undergo a pre-shaping step wherein they are pressed against a forming die having the same shape as the guide bar nose. To enable that preforming to occur without creating cracks, the material should have a relatively low hardness, e.g., around 40–45 HRC. However, in accordance with another aspect of the invention, the strips are age hardened after being preshaped. This can be performed by a known age-hardening procedure for Stellite 6®, namely by heating the strip (11) to 1470–1500° F. (800–815° C.) for at least 3 hours, or heating the strip to about 1380° F. (750° C.) for at least 7 hours, which procedures raise the hardness by at least 7 points HRC. That age hardening is performed after separating the strips from one another and performing the preforming step, but before welding the strips onto the rails.

It has been previously known to surface harden wear-resistant nose strips, but that does not produce a uniform hardness throughout the strip, i.e., the hardness is reduced as the strip wears. Thus, in accordance with the present invention in which a wear-resistant nose strip is age-hardened, the strip exhibits the same amount of hardness as it wears.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A method of increasing the wear resistance of a nose of a chain saw guide bar, the guide bar comprising two side rails forming a groove therebetween, each side rail having an edge surface, the side rails being curved at one end thereof to form a nose, the method comprising the steps of:

A) providing a plate of wear resistant alloy having a thickness substantially equal to a width of each of the edge surfaces;

B) making a series of identical cuts through the plate to form identically wave-shaped elements, each wave-shaped element including at least two generally U-shaped strips joined end-to-end, each strip having a non-uniform width which is greater at a crest of the strip than at the ends thereof;

C) separating the strips from one another; and

D) welding each strip onto the edge surface of a respective side rail at the nose thereof, with the crest of the strip situated at a tip of the nose.

2. The method according to claim 1 wherein the cuts in step B are made by laser-cutting.

3. The method according to claim 2 wherein step D is performed by laser welding.

4. The method according to claim 1 wherein the cuts in step B are made by abrasive jet cutting.

5. The method according to claim 1 wherein step B is performed such that the strips form respective pockets opening in opposite directions.

6. The method according to claim 5 wherein each of the elements is shaped as a sine wave.

7. The method according to claim 1 wherein step B is performed such that the strips form respective pockets opening in the same direction.

8. The method according to claim 1 wherein step B is performed such that a curvature of the crest of each strip coincides with a curvature of the tip of the nose.

9. The method according to claim 1 wherein step B is performed such that a curvature of the ends of each strip is smaller than a curvature of the corresponding part of the nose, and further comprising, prior to step D, the steps of preshaping the strip by pressing the strip against a forming die having a curvature corresponding to a shape of the guide bar nose, and then hardening the strip.

10. The method according to claim 1 wherein step A comprises providing a plate of cobalt-chrome-tungsten alloy and further comprising, between steps C and D, the step of age-hardening each strip by heating the strip to a temperature of from 1470 to 1500° F. for at least three hours.

11. The method according to claim 1 wherein step A comprises providing a plate of cobalt-chrome-tungsten alloy, and further comprising, between steps C and D, the step of age-hardening each strip by heating the strip to a temperature of at least 1380° F. for at least seven hours.

12. A method of increasing wear resistance of a nose portion of a chain saw guide bar, the guide bar comprising two side rails forming a groove therebetween, each side rail having an edge surface, and being curved at one end thereof to form a nose, the method comprising the steps of:

A) producing generally U-shaped strips of cobalt-chrome-tungsten alloy each having a curvature corresponding generally to a curvature of the edge surface at the nose;

B) age hardening the strips by heating the strips to a temperature of at least 1380° F. for at least seven hours; and C) welding each of the strips to a respective edge surface at the nose thereof.

13. A method of increasing wear resistance of a nose portion of a chain saw guide bar, the guide bar comprising two side rails forming a groove therebetween, each side rail having an edge surface, and being curved at one end thereof to form a nose, the method comprising the steps of:

A) producing generally U-shaped strips of cobalt-chrome-tungsten alloy each having a curvature corresponding generally to a curvature of the edge surface at the nose;

B) age hardening the strips by heating the strips to a temperature of from 1470 to 1500° F. for at least three hours; and C) welding each of the strips to a respective edge surface at the nose thereof.

* * * * *